Jan. 11, 1966  G. THIELE  3,228,230
INTEGRATOR WITH AUTOMATIC COMPENSATION
OF THE VARIATION OF THE ZERO-POINT
Filed Jan. 4, 1962

INVENTOR
*GUNTHER THIELE*
BY
AGENT

United States Patent Office 3,228,230
Patented Jan. 11, 1966

3,228,230
INTEGRATOR WITH AUTOMATIC COMPENSATION OF THE VARIATION OF THE ZERO-POINT
Günther Thiele, Frankfurt am Main, Germany, assignor to North American Philips Company, Inc., New York, N.Y., a corporation of Delaware
Filed Jan. 4, 1962, Ser. No. 164,354
Claims priority, application Germany, Jan. 18, 1961, P 26,406
7 Claims. (Cl. 73—27)

This invention relates to an integrator and in particular to an integrator for use in gas chromatographic apparatus in which the measuring and comparison cells are operated in a bridge-circuit to supply a voltage which is in turn converted into an alternating voltage having a frequency which is proportional thereto, the cycles of which are countered per unit of time or during definite periods.

In gas chromatography, for example, the gas components are determined by measurement of the heat conductivity in a measuring cell. For the quantitative evaluation of a diagram which represents the output voltage of the heat conductivity cell as a function of time, the determination of the peak area, that is to say of the area enclosed by the curve and the reference line, is in many cases required.

In addition to the simple method of determining the integrated area by planimetering the individual peaks from the diagram, automatic integrators are known which may be connected to potentiometers of the compensators used for the measurement of the voltage. A counting or printing device is influenced in different manner by the output voltage of the potentiometer and by time in a manner such that these devices indicate figures which are proportional in time to the integral:

$$K \int_{A_1}^{A_2} u\, dt$$

where K is the factor of proportionality and $u$ the voltage.

However, in all of these intergrators it is assumed that the zero point remains constant, that is to say that after performing the analysis the measuring cell again supplies the same voltage as initially and that consequently the same deflection again occurs at the compensator. However, this often is not the case since unwanted variations of the resistance of the measuring cell wires may occur owing to fluctuations in temperature and atmospheric air pressure and variations of the carrier gas velocity. In the case of a varying zero point, the known automatic integrators give incorrect indications.

According to the invention, this drawback is avoided in that means are provided which, in the case of a variation of the zero point of the measuring cell and/or of the comparison cell, restore the zero-setting of the integrator.

In order that the invention may readily be carried into effect, one embodiment thereof will now be described by way of example with reference to the accompanying drawing, in which.

Figure 1:
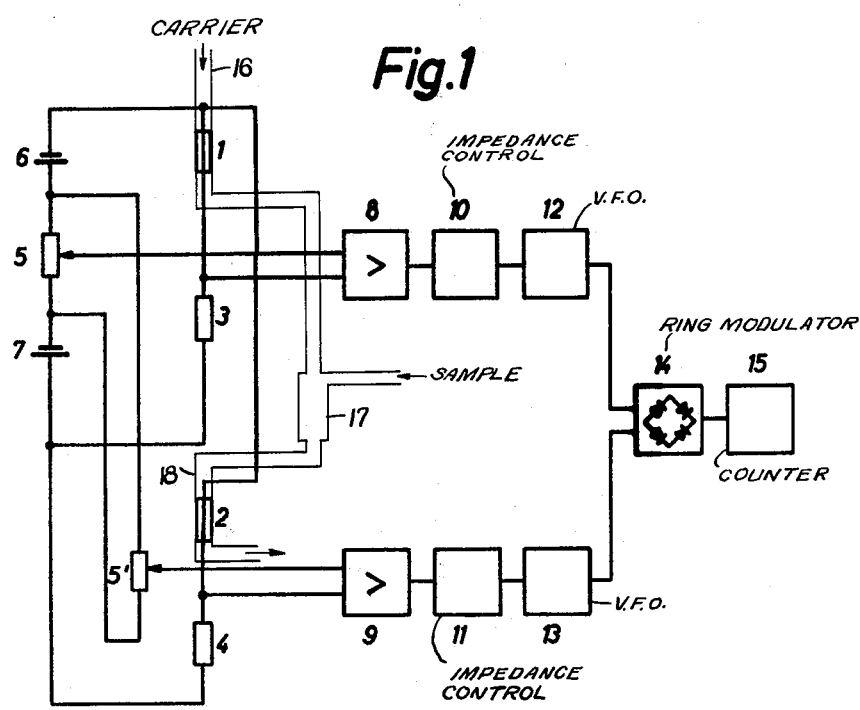
FIGURE 1 is a block diagram illustrating one form of the invention.

According to FIGURE 1, only the carrier gas is flowing around the resistance wire of the comparison cell 1, whereas the carrier gas and the mixture to be analysed are flowing around the resistance wire of the measuring cell 2. The carrier gas is supplied to comparison cell 1 via a conduit 16. The carrier gas and the sample mixture are supplied to the chromatographic column 17, and then to measuring cell 2 via a conduit 18. The resistors 3 and 4 are highly-constant fixed resistors outside the measuring and comparison cells. The relative resistance variations of the measuring cell 1 with respect to the resistor 3 and of the measuring cell 2 with respect to the resistor 4 are converted, by means of the compensating circuit which comprises the resistors 5 and 5' and the batteries 6 and 7, into voltage variations which, after amplification in amplifiers 8 and 9, are supplied to the impedance control stages 10 and 11. These stages may be constructed in known manner from transistors or tubes. One convenient form of impedance control stage may use a reactance tube circuit as described at pages 654 and 655 of Terman's "Radio Engineers Handbook" (first edition, 1943). Of course it is also possible to provide only one battery with a corresponding circuit. The impedance control stages exhibit a linear variation in their inductive reactance in known manner within certain limits proportional to the applied voltage. They are each connected to one of the oscillatory circuits of the two heterodyne oscillators 12 and 13, as a result of which alternating voltages occur at the outputs of 12 and 13, the frequencies of which are proportional to the resistance variations of the measuring and comparison cell resistors 1 and 2. The difference frequency of these two frequencies is produced in a ring modulator 14 and supplied to an electronic counter 15 which counts this frequency. Resistance elements 1, 3 and 5 comprise a first bridge circuit and resistance elements 2, 4 and 5' comprise a second bridge circuit in parallel therewith.

Before the beginning of the analysis, the output frequency of the heterodyne oscillators 12 and 13 is adjusted as close to 0 cycles per second as possible by varying the oscillatory circuit capacitances, so that no alternating voltage occurs at the output of the ring modulator 14 and the electronic counter remains at the value 0000. For the maximum resistance and voltage variations respectively of the measuring cell occurring in practice, the maximum frequency of the heterodyne oscillator 13 must amount to a few kilocycles per second. As a result the heterodyne oscillators may fluctuate a few cycles per second in their zero position without noticeably deteriorating the measuring accuracy.

Figure 2:
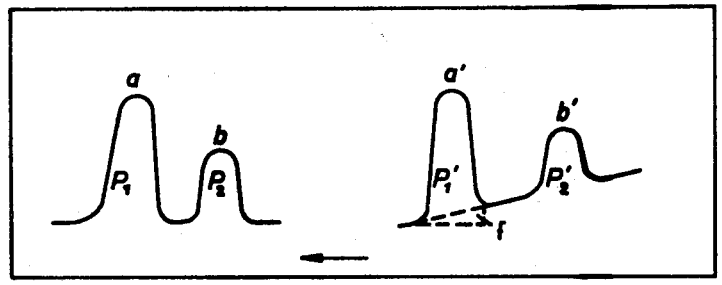
FIGURE 2 is a diagram in which the curves illustrate a recording at constant zero point and at varying zero point.

If the zero point remains constant during analysis, as is the case in the diagram on the left hand side of FIGURE 2, that is to say if the value of the resistor of the comparison cell 1 around which only carrier gas is flowing does not vary, no alternating voltage, or an alternating voltage of a very low frequency, occurs at the heterodyne oscillator 12. Only the measuring cell 2 is influenced by the gas components in a manner such that the frequency of the heterodyne oscillator 13 is adjusted in accordance with the gas components concerned. As a result, the counter 15 will indicate a value each time after the end of a peak $a$ and $b$ respectively which is proportional to the integrated resistance-time, i.e. to the areas $p_1$ or $p_2$ respectively.

If, on the contrary, the resistance of the comparison cell 1 varied during the analysis owing to fluctuations in temperature or pressure and so on, a portion of the area is lacking in the peak area $p'_1$ (right hand diagram of FIGURE 2) which has the same effect as an error proportional thereto. However, the heterodyne oscillator 12 supplies frequencies which are proportional thereto, which continuously decrease the output frequency of the ring modulator 14 by a value which just compensates for the zero point variation. In the case of variations of the measuring cell 2, the value is increased owing to the portion of the area lying below the reference line ($f$ in FIGURE 2).

For the qualitative performance of the analysis, the output of the amplifier 9 may be connected to a simple direct recorder of a suitable frequency range, from which the individual gas components may in known manner be read and determined. In addition, switching members may be provided by means of which the integrated values of the successive peaks are retained in intermediate memory devices and then automatically printed out in succession.

In principle, the same method may be used if the measurement and recording of the voltage supplied by the heat conductivity cell occurs by means of self-balancing compensators. Usually, these compensators have so-called potentiometers, from which resistance values can be taken which are each time proportional to the measuring quantity. The potentiometers of two compensators may consequently be provided in an analogous manner instead of the resistors of the cells 1 and 2.

Although the invention has been described in connection with a specific embodiment, it is to be understood that many modifications thereof will be apparent to those skilled in the art without departing from the underlying principles of the invention, the only limitations on the scope of the invention being those set forth in the appended claims.

What is claimed is:

1. Apparatus for analyzing a gas sample comprising a source of supply voltage, first and second branch circuits connected to said voltage source, said first branch comprising a measuring cell through which said gas sample and a carrier gas flows and comprising an element having resistance variations as determined by variations in the composition of said gas sample flowing thereover, said second branch comprising a comparison cell having a similar type element through which said carrier gas flows, means for deriving a control voltage from said first branch circuit which varies in accordance with the resistance variations of said measuring cell, integrating means comprising means responsive to said control voltage for deriving an alternating voltage having a frequency which is determined by said control voltage and means for determining the value of said frequency, means for deriving a second control voltage from said second branch circuit which varies with the resistance variations of said measuring cell and said comparison cell from a reference value, and means for supplying said second control voltage to said integrating means, said integrating means further comprising means responsive to said second control voltage for modifying the frequency of said derived alternating voltage in accordance therewith whereby the frequency of said derived alternating voltage is corrected for said variations from said reference value.

2. Apparatus for analyzing a gas sample comprising a source of supply voltage, first and second branch circuits connected to said voltage source, said first branch comprising a measuring cell through which said gas sample and a carrier gas passes and including an element having resistance variations as determined by variations in the composition of said gas sample, said second branch comprising a comparison cell having a similar type resistance element through which said carrier gas passes, means for deriving a first control voltage from said first branch circuit which is proportional to the resistance variations of said measuring cell, means for deriving a second control voltage from said second branch circuit which is proportional to the resistance variations in said comparison cell, first means responsive to said first control voltage for producing an alternating voltage having a frequency which is determined by said first control voltage, second means responsive to said second control voltage for producing a second alternating voltage having a frequency which is determined by said second control voltage, means for combining said alternating voltages to produce an alternating voltage of the difference frequency, and means for determining the value of said difference frequency.

3. Apparatus for analyzing a gas sample comprising a source of supply voltage, a first bridge circuit connected to said voltage source and comprising first and second branches, said first branch including a measuring cell through which said gas sample and a carrier gas passes, said measuring cell comprising an impedance element having resistance variations as determined by variations in the composition of said gas sample, a second bridge circuit connected to said voltage source and comprising third and fourth branches, said third branch circuit including a comparison cell having a similar type impedance element through which said carrier gas passes, means for deriving a first control voltage from a junction point of said first branch circuit which is proportional to the resistance variations of said measuring cell, means for deriving a second control voltage from a junction point of said third branch circuit which is proportional to the resistance variations in said comparison cell, integrating means having first and second channels, means for supplying said first control voltage as an input to said first channel, means for supplying said second control voltage as an input to said second channel, each of said channels comprising means responsive to its respective input voltage for producing an alternating voltage having a frequency which is determined by its respective input control voltage, means for combining the first and second alternating voltages produced by said first and second channels to provide an alternating voltage of the difference frequency, and means for determining the value of said difference frequency.

4. Apparatus for analyzing a gas sample comprising a source of supply voltage, a first bridge circuit comprising first and second branches connected to said voltage source, said first branch comprising a measuring cell having a temperature-dependent resistance element, means for passing said gas sample and a carrier gas through said measuring cell in heat conducting relationship with said resistance element, a second bridge circuit comprising third and fourth branches connected to said voltage source, said third branch comprising a comparison cell having a temperature-dependent resistance element, means for passing said carrier gas through said comparison cell in heat conducting relationship with said resistance element, means for deriving a first control voltage from said first bridge circuit which varies with the resistance variations of said measuring cell, means for deriving a second control voltage from said second bridge circuit which varies with the resistance variations in said comparison cell, first means responsive to said first control voltage for producing an alternating voltage having a frequency which is determined by said first control voltage, second means responsive to said second control voltage for producing a second alternating voltage having a frequency which is determined by said second control voltage, means for combining said alternating voltages to produce an alternating voltage of the difference frequency, and electronic counting means for determining the value of said difference frequency.

5. Apparatus as described in claim 4 wherein said first and third branches of said first and second bridge circuits are connected in parallel and said second and fourth branches of said first and second bridge circuits are connected in parallel.

6. Apparatus as described in claim 5 wherein said supply voltage is a direct current voltage and said second and fourth branches each include a potentiometer having a variable tap which supplies one input to said first and second alternating voltage producing means, respectively.

7. Apparatus as described in claim 6 wherein said first and second control voltages are direct current voltages, and wherein each of said first and second alternating voltage producing means comprises a reactance tube circuit responsive to its respective direct current voltage supplied by its respective bridge circuit for converting said voltage into a corresponding variation in reactance and alternating voltage oscillation circuit means responsive to said variation in reactance to produce corresponding frequency variations in said alternating voltage, and wherein said means for combining comprises a demodulator circuit.

References Cited by the Examiner
UNITED STATES PATENTS

| | | | |
|---|---|---|---|
| 2,942,779 | 6/1960 | Wood | 253—183 |
| 3,009,098 | 11/1961 | Simons | 73—23.1 |
| 3,049,908 | 8/1962 | Kindred et al. | 73—23 |

RICHARD C. QUEISSER, *Primary Examiner.*